US010528679B2

(12) United States Patent
Kodimer (10) Patent No.: US 10,528,679 B2
(45) Date of Patent: Jan. 7, 2020

(54) SYSTEM AND METHOD FOR REAL TIME TRANSLATION

(71) Applicants: Kabushiki Kaisha Toshiba, Minato-ku (JP); Toshiba TEC Kabushiki Kaisha, Shinagawa-ku (JP)

(72) Inventor: Marianne Kodimer, Huntington Beach, CA (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 16/539,460

(22) Filed: Aug. 13, 2019

(65) Prior Publication Data
US 2019/0370339 A1 Dec. 5, 2019

Related U.S. Application Data

(63) Continuation of application No. 15/692,707, filed on Aug. 31, 2017.

(60) Provisional application No. 62/410,520, filed on Oct. 20, 2016.

(51) Int. Cl.
*G06F 17/28* (2006.01)
*H04N 1/00* (2006.01)
*G06F 17/20* (2006.01)

(52) U.S. Cl.
CPC ....... *G06F 17/289* (2013.01); *H04N 1/00411* (2013.01); *H04N 1/00427* (2013.01); *H04N 1/00437* (2013.01); *H04N 1/00472* (2013.01); *H04N 2201/0094* (2013.01)

(58) Field of Classification Search
CPC .............. G06F 17/289; H04N 1/00472; H04N 1/00427; H04N 1/00411; H04N 1/00437; H04N 2201/0094
USPC ........................................................... 704/3
See application file for complete search history.

(56) References Cited

U.S. PATENT DOCUMENTS

| | | | |
|---|---|---|---|
| 2005/0122537 A1* | 6/2005 | Shin | G06F 17/289 358/1.13 |
| 2005/0197825 A1* | 9/2005 | Hagerman | G06F 17/289 704/2 |
| 2017/0085737 A1* | 3/2017 | Morikawa | G09F 9/00 |

* cited by examiner

*Primary Examiner* — Thierry L Pham
(74) *Attorney, Agent, or Firm* — Ulmer & Berne LLP (57) ABSTRACT

A system and method for real time translation of scanned documents includes a multifunction peripheral having intelligent controller including a processor and associated memory. A scan engine generates an electronic image of a tangible document and a touchscreen user interface receives a user scan instruction. The scan operation generates a scan file and a generated image of the document is displayed on the touchscreen. A user selects an area of the generated image via the touchscreen. An optical character recognition operation generates a character based file which is then translated from a source language to a target language. The resultant translation is then displayed on the touchscreen.

20 Claims, 7 Drawing Sheets

SYSTEM AND METHOD FOR REAL TIME TRANSLATION

RELATED APPLICATIONS

This application is a Continuation to U.S. patent application Ser. No. 15/692,707, filed Aug. 31, 2017, which claims the benefit of U.S. Provisional Application No. 62/410,520, filed Oct. 20, 2016, which is incorporated herein by reference.

TECHNICAL FIELD

This application relates generally to a multifunction peripheral with integrated machine translation. The application relates more particularly to translation of specified areas of a scanned document selected from a preview image displayed on a device touchscreen.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are becoming increasingly capable and increasingly complex. User control and interaction is typically made via a touchscreen working in concert with an intelligent controller comprised of an on board computer system.

MFPs may have integrated scanners that will take a physical document and generate a corresponding electronic image scan file. Many MFPs have an ability to convert a scan file to various file formats, such as portable document format (PDF), Joint Photographic Experts Group (JPEG), Graphical Image Format (GIF), tagged information file format (TIFF), bitmap (BMP), Portable Network Graphics (PNG), or the like.

SUMMARY

In accordance with an example embodiment of the subject application, a system and method for real time translation of scanned documents includes a multifunction peripheral having an intelligent controller including a processor and associated memory. A scan engine generates an electronic image of a tangible document and a touchscreen user interface receives a user scan instruction. The scan operation generates a scan file which provides an image of the document on the touchscreen. A user selects an area of the generated image via the touchscreen. An optical character recognition operation generates a character based file which is then translated from source language to a target language. The resultant translation is then displayed on the touchscreen.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Once a file has been scanned on an MFP into an electronic format as noted above, it is possible to run an application on a computer or workstation which is able to extract character information from graphical files in a process called optical character recognition (OCR). A user loads an image file and the application generates a character inclusive file that can be printed or edited with a standard word processing application. Characters may be encoded in any suitable format such as ASCII, EBCDIC, ISO 8859, Unicode, JIS or the like. Characters may include phonetic characters, such as used in western Europe or the Americas, or ideographs, such as used in Asian countries.

Another application may take a character encoded file and perform a machine translation between languages. This can also be done online, such as by use of GOOGLE translate, which is a service instantly translates words, phrases, and web pages between English and over 100 other languages.

From the forgoing, if one desires to scan a document for translation, it can be a time consuming process. First, a scan has to be made, such as by an MFP. A resulting scan file must be captured and loaded into an OCR program for conversion. The resultant OCR file must be then loaded into a machine translation application for conversion. If a printout is then desired, the machine translated file must be brought to or sent to an MFP for printing. In such an instance, the entire translated document will be printed, unless user determines which page or pages are needed and manually selects only these pages for printing.

This process is a time consuming and labor intensive mechanism for securing a printout of a machine translation to a scanned document. In addition, it requires more processing power than may be required if only a portion of a scanned document is desired for translation as there is generally no mechanism to translate only a portion of a page. This can lead to problems, such as when a document includes multiple languages, since translation programs need to identify a source file language and a target file language to work. In some instances, a document may contain quotes or excerpts in one language and a text body in another language. A user may only need to translated selected portions of a document. Example embodiments herein provide for real time scanning of documents with machine translation of document portions selected by a user working from a preview image displayed on a device touchscreen. The translated portion is suitably superimposed on the preview image and a user may print the resultant, hybridized page. This may be all be completed in a single operation.

Figure 1:
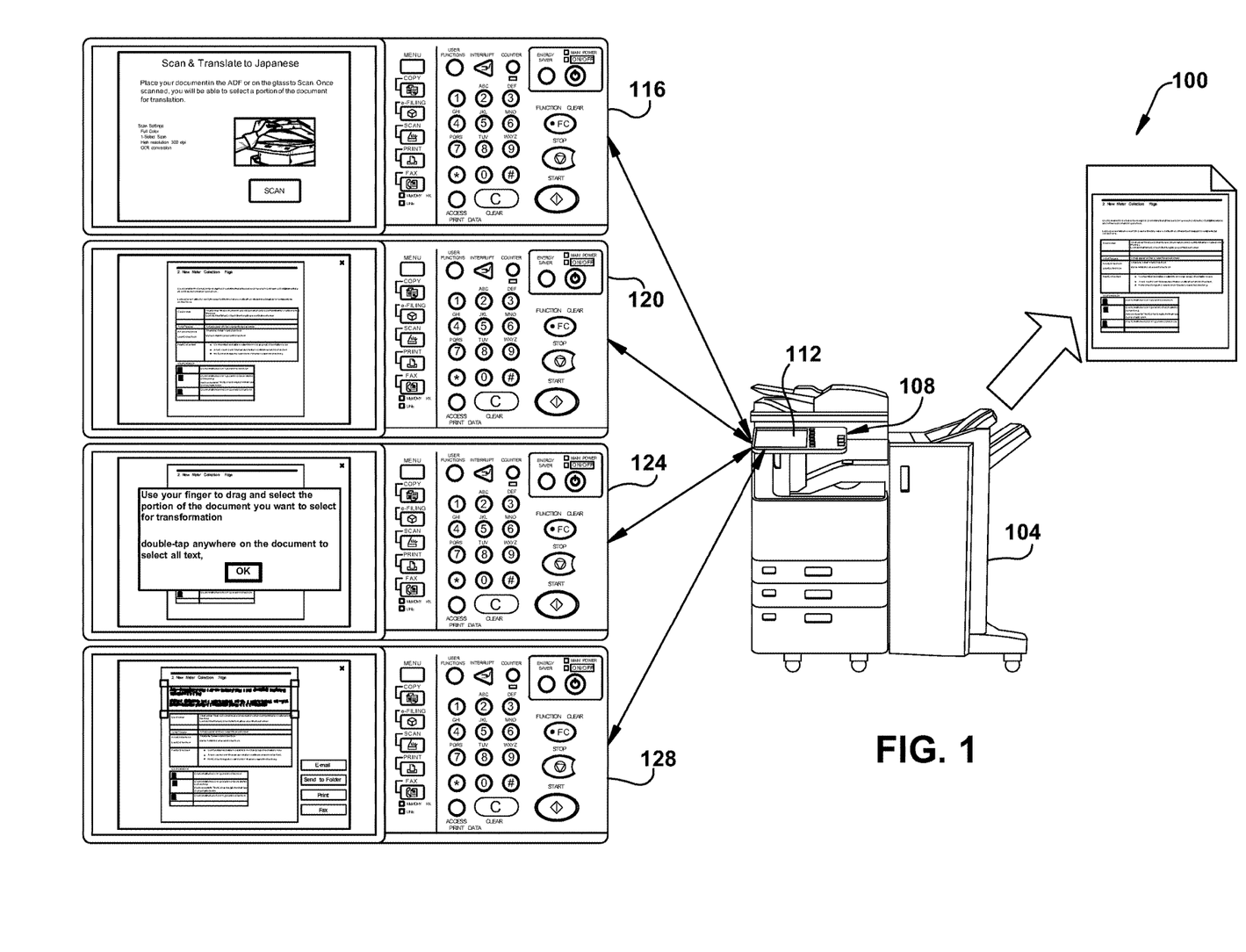
FIG. 1 an example embodiment of a real time scan translation system.

In accordance with the subject application, FIG. 1 illustrates an example embodiment of a real time scan translation system 100 running on MFP 104. MFP 104 includes a user interface 108 including a touchscreen 112 configured to generate graphical or text images, and suitably programmable to generate a soft keyboard for numeric or text entry. In the illustrated example embodiment, real time scan translation on the MFP 104 is accomplished through a series of user interface renderings 116, 120, 124 and 128 additional detail for which are found in FIGS. 2-7, respectively.

Figure 2:
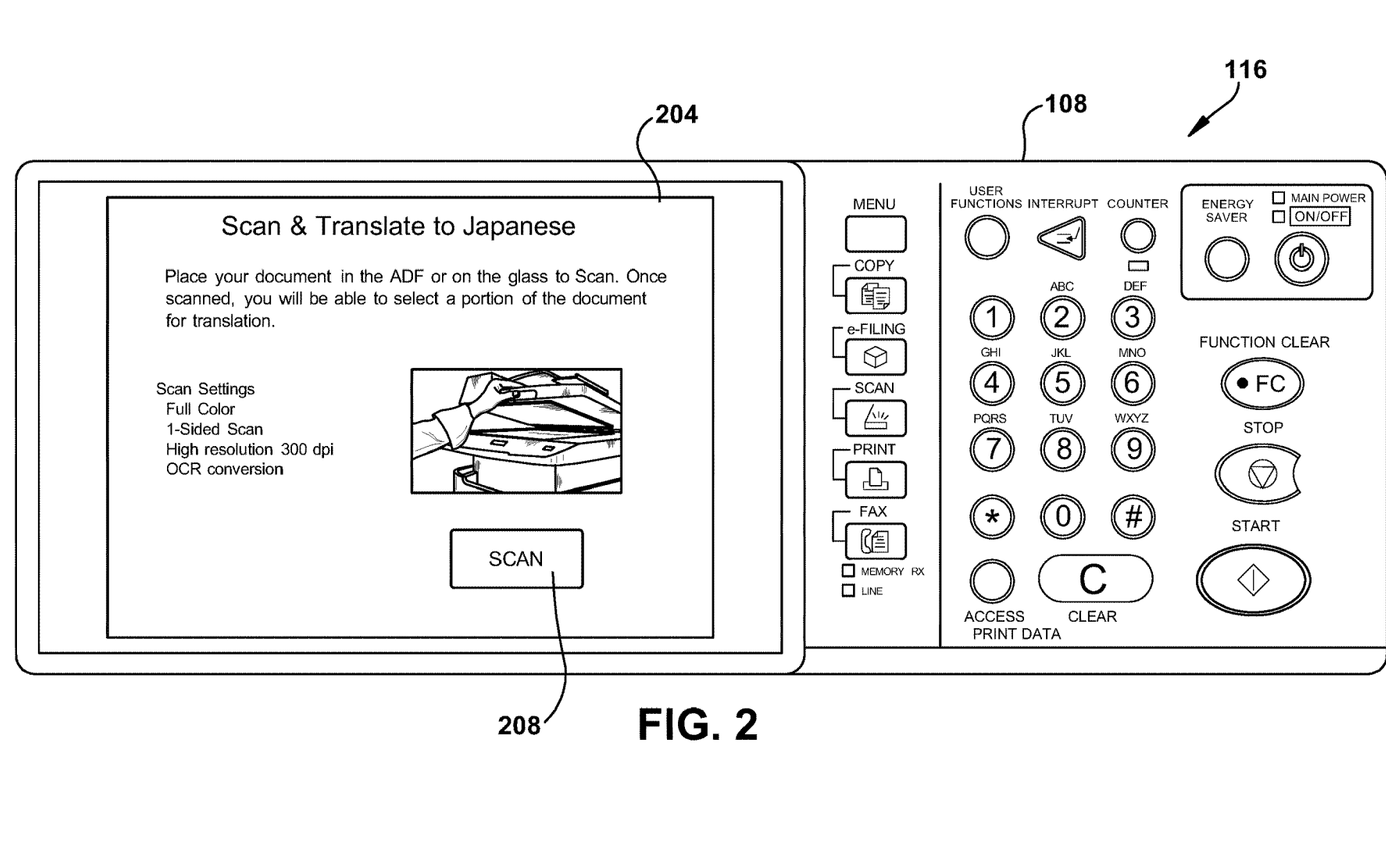
FIG. 2 is an example embodiment of a graphical rendering of a device control screen.

Interface rendering 116, with added reference to FIG. 2, includes a graphical rendering of a device control screen 204 for conversion a selected portion of a paper document in source language to a displayed or printed document in a target language. Source and target documents may be selected by a user, or specific applications for a particular translation may be launched. As noted above, it may also be possible to auto-detect a source language, which auto-detection may suitably be confirmed by a user via touchscreen interface 112. In the illustrated example embodiment, a translation from English to Japanese is selected, and a scan of a paper document commenced by depressing soft scan key 208.

Figure 3:
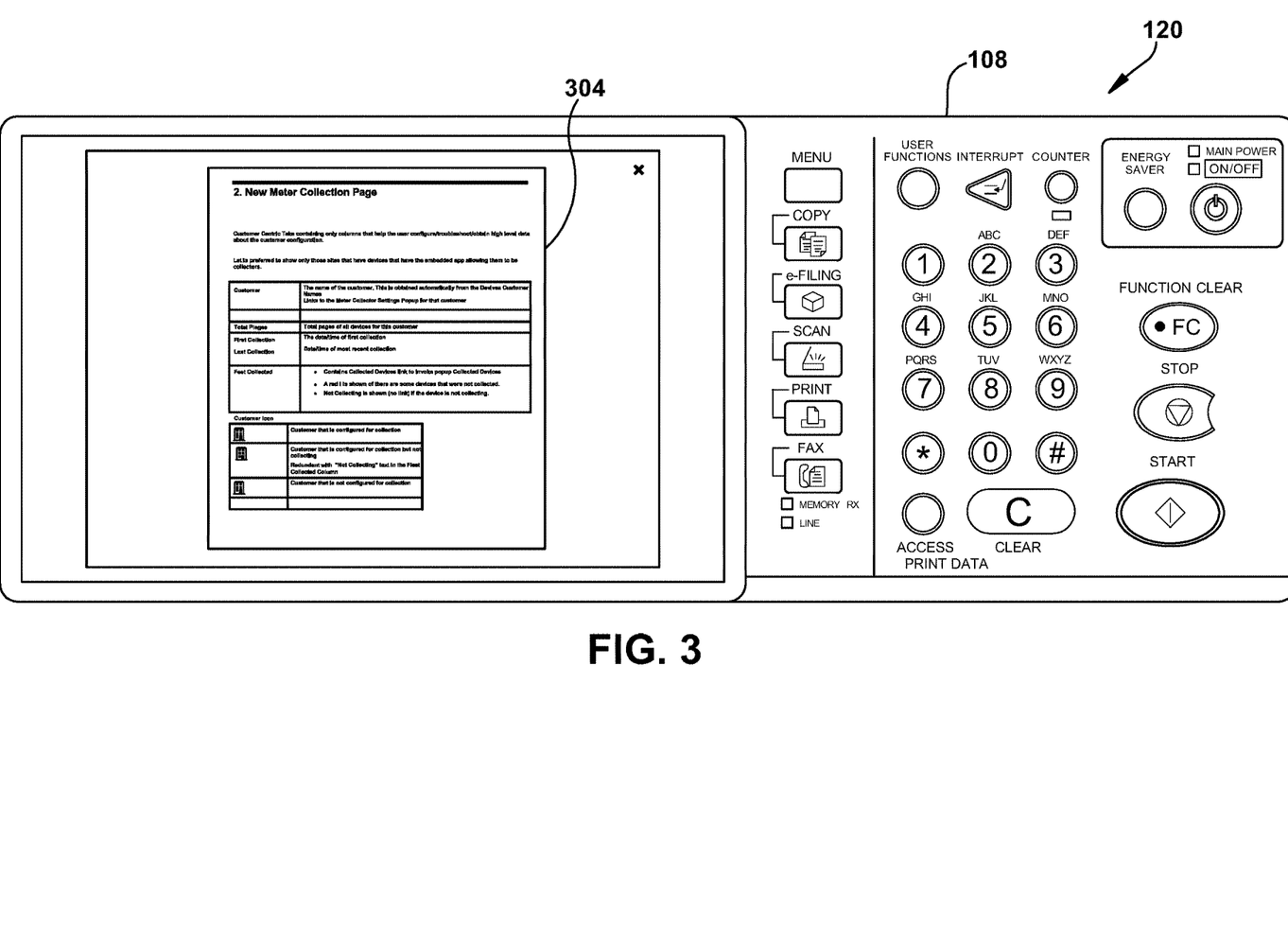
FIG. 3 is an example embodiment of a graphical rendering of a device control screen.
Figure 4:
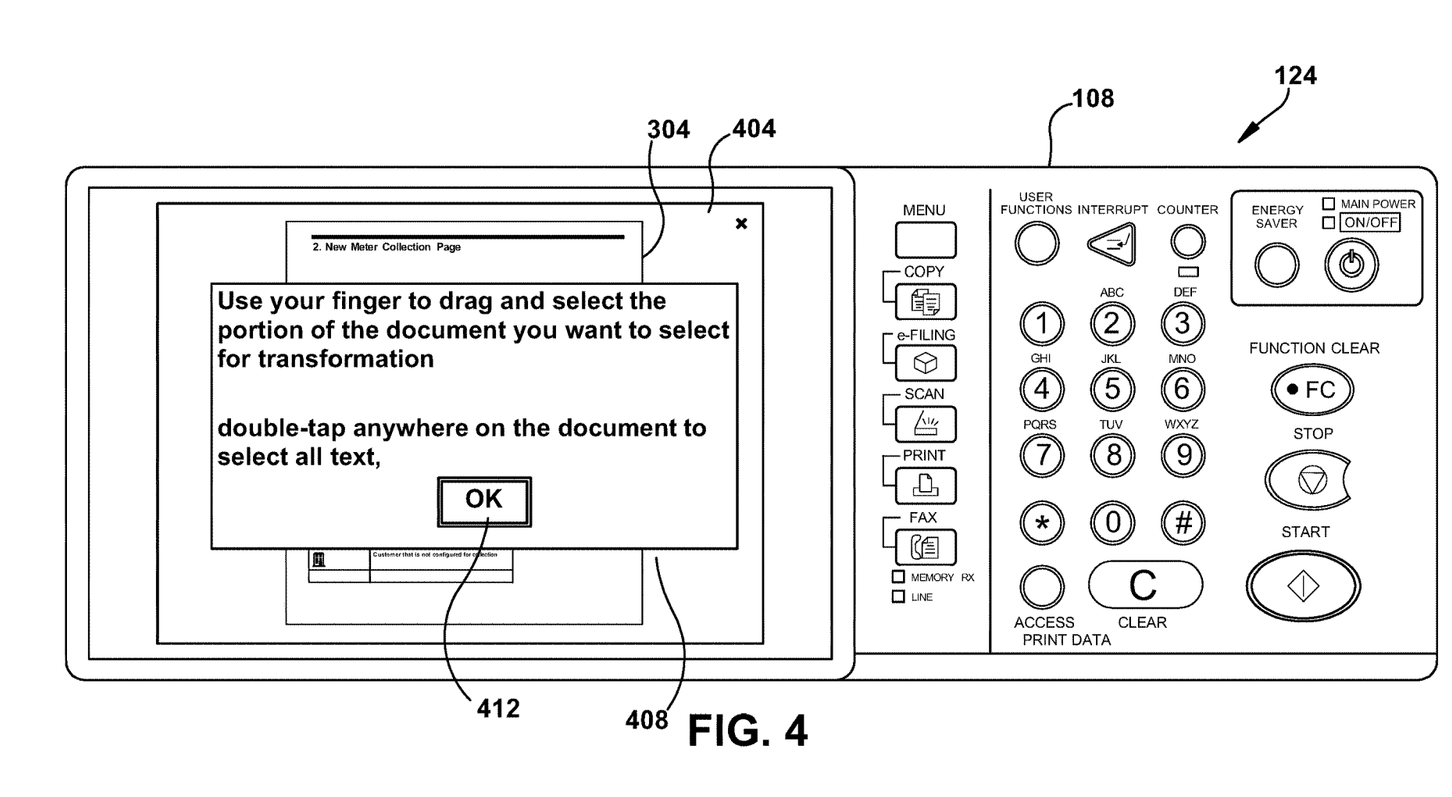
FIG. 4 is an example embodiment of a graphical rendering of a device control screen.

Next, with added reference to FIG. 3, interface rendering 120 depicts a preview or thumbnail image 304 from a scan initiated by the pressing of the scan key 208 of FIG. 2. With added reference to FIG. 4, a graphical rendering of device screen 404 shows a prompt 408 for commencing a document area selection on preview image 304, suitably commenced by pressing soft OK button 412.

Figure 5:
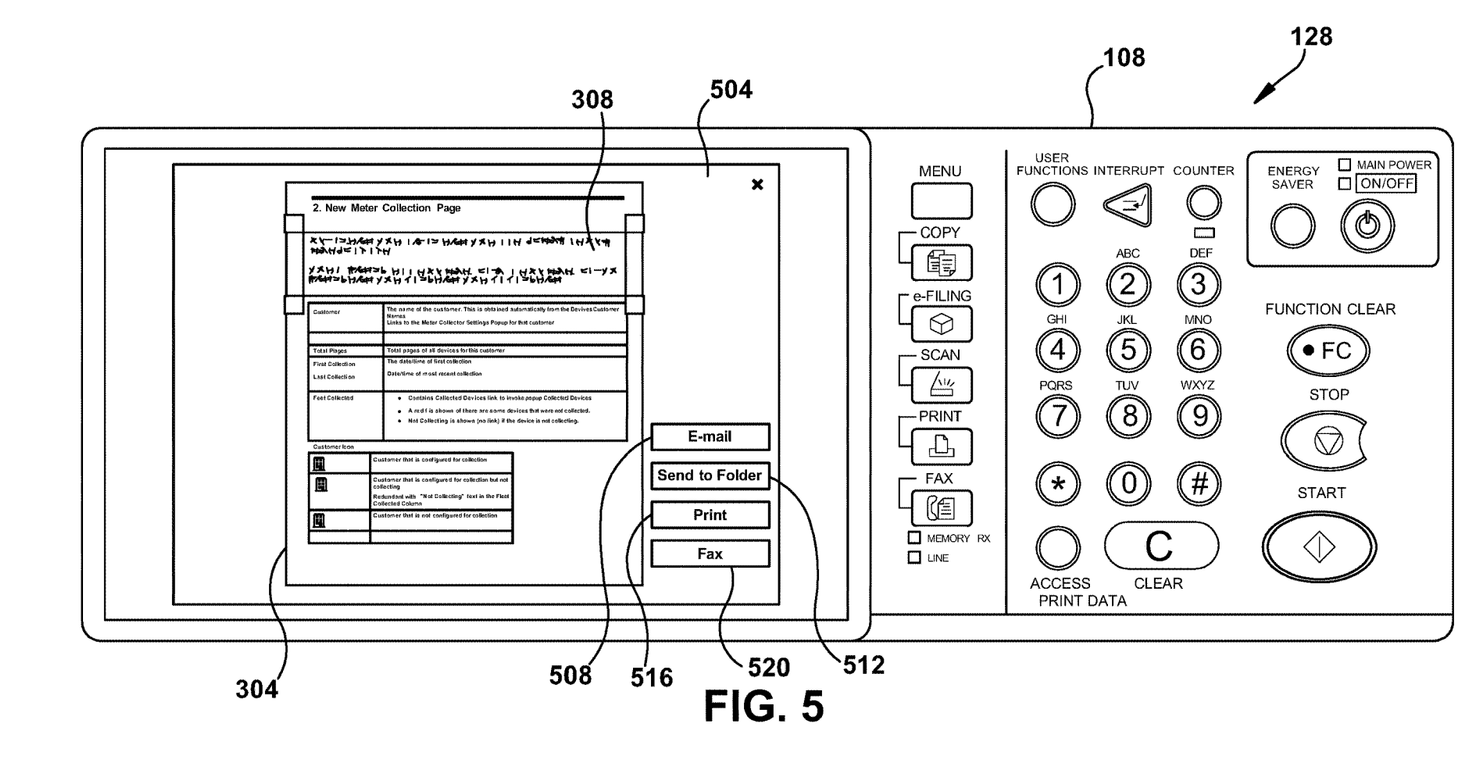
FIG. 5 is an example embodiment of a graphical rendering of a device control screen.

With added reference to FIG. 5, interface rendering 504 shows preview image 304 with an area 308 selected for translation. Such selection is suitably made by any touchscreen gesture on the device screen 504, such as touching boundaries such as edges or corners, dragging a box or boundaries by dragging a finger across the touchscreen, or dragging and dropping area templates. A user can also select the entire preview image, for example by double tapping the preview image. In the illustrated example, a translation of selected area 308 occurs as soon as the area selection has been made such that translated text is superimposed over the selected area 308. From that point, the user can print or transmit the hybridized image such as by selection of soft keys for emailing 508, saving to folder 512, printing 516 or faxing 520.

Figure 6:
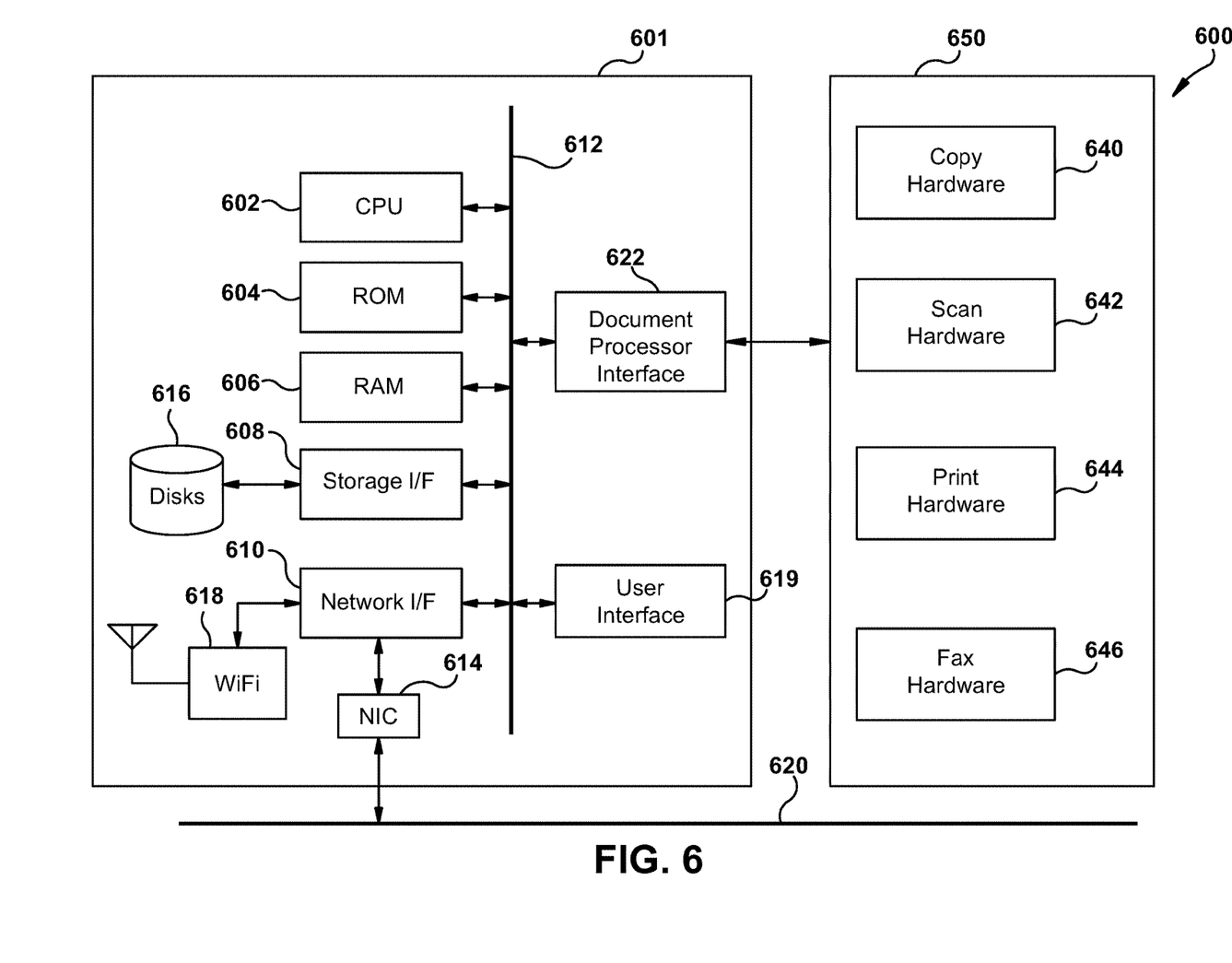
FIG. 6 is an example embodiment of a networked digital device.

Turning now to FIG. 6 illustrated is an example embodiment of a networked digital device comprised of document rendering system 600 suitably comprised within an MFP, such as with MFP 104 of FIG. 1. Included in controller 601 are one or more processors, such as that illustrated by processor 602. Each processor is suitably associated with non-volatile memory, such as ROM 604, and random access memory (RAM) 606, via a data bus 612.

Processor 602 is also in data communication with a storage interface 608 for reading or writing to a storage 616, suitably comprised of a hard disk, optical disk, solid-state disk, cloud-based storage, or any other suitable data storage as will be appreciated by one of ordinary skill in the art.

Processor 602 is also in data communication with a network interface 610 which provides an interface to a network interface controller (NIC) 614, which in turn provides a data path to any suitable wired or physical network connection 620, or to a wireless data connection via wireless network interface 618. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 602 can also be in data communication with any suitable user input/output (I/O) interface 619 which provides data communication with user peripherals, such as displays, keyboards, mice, track balls, touchscreens, or the like.

Also in data communication with data bus 612 is a document processor interface 622 suitable for data communication with NFP functional units 650. In the illustrate example, these units include copy hardware 640, scan hardware 642, print hardware 644 and fax hardware 650 which together comprise NFP functional hardware 650. Hardware monitors suitably provide device event data, working in concert with suitable monitoring systems. By way of further example, monitoring systems may include page counters, sensor output, such as consumable level sensors, temperature sensors, power quality sensors, device error sensors, door open sensors, and the like. It will be understood that functional units are suitably comprised of intelligent units, including any suitable hardware or software platform.

Figure 7:
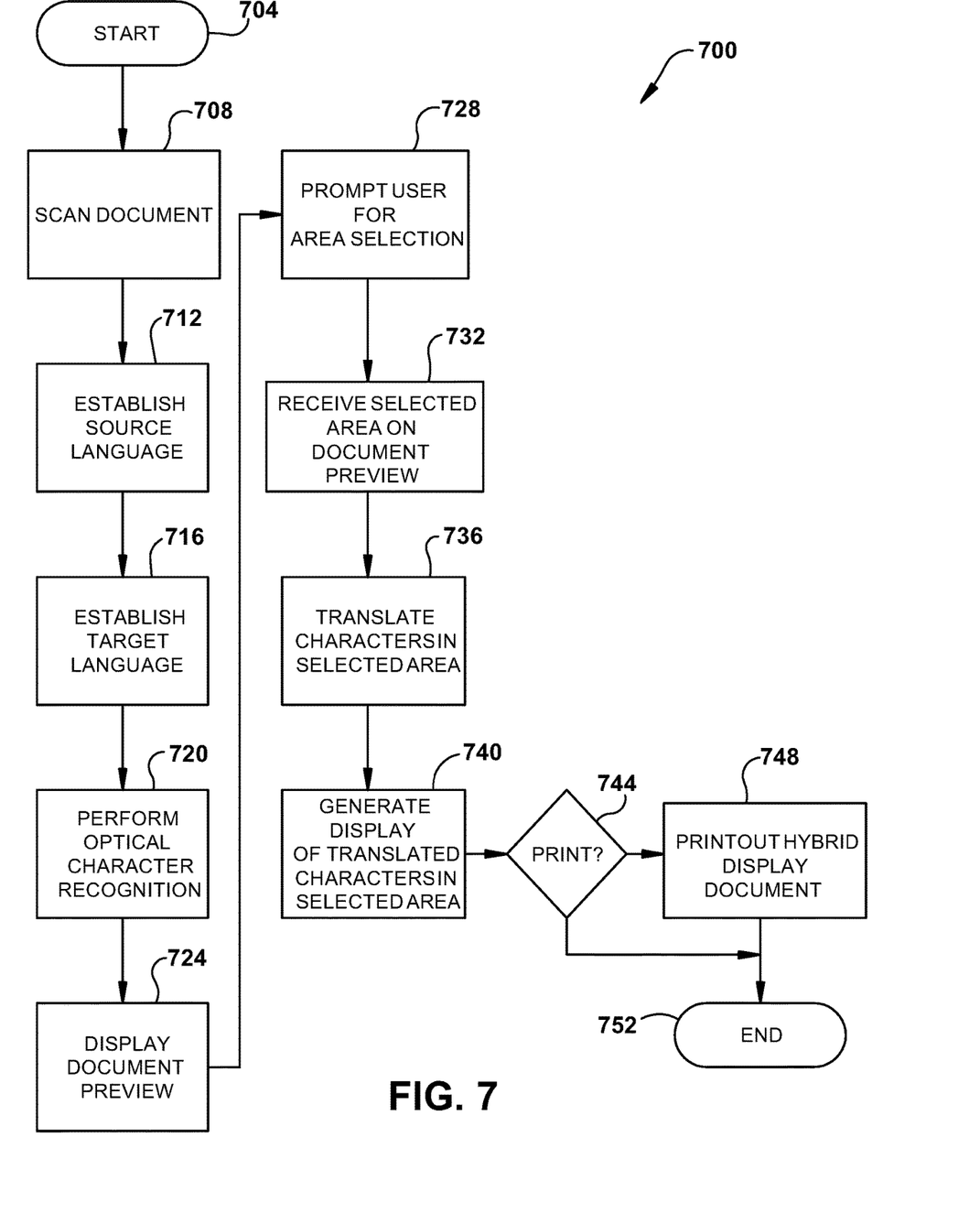
FIG. 7 is a flowchart of an example embodiment of a system for real time translation of a selected document scan area.

Referring next to FIG. 7, illustrated is a flowchart 700 of an example embodiment of a system for real time translation of a selected document scan area. The process commences at block 704 and a document is scanned at block 708. A source language is established at block 712, either by auto-detection or user specification as noted above. Next, a target language is selected by a user or by virtue of a previously chosen application at block 716. An optical character recognition operation is performed on block 720, and a document preview generated on a touchscreen at block 724. A user is prompted to select a scan area at block 728, which area is received in block 732 and a translation of characters in the selected area completed at block 736 resulting in a display of the translation in block 740, suitably superimposing an image of the translation over the selected area. Alternative embodiments may comprise completion of an OCR operation and a translation for an entire document while revealing only a portion of the translated document associated with a selected area. In other embodiments, an OCR may be made of an entire document and a translation made only for the selected area. In still another embodiment, and OCR and translation operation may occur solely on characters in the selected area.

Next, a user may choose to print a document form displayed, hybrid image at block 744, or perform any other desire action such as saving, e-mailing or faxing the image. Processing then ends at block 752.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
an intelligent controller including a processor and associated memory;
a scan engine configured to generate an electronic image; and
a touchscreen user interface configured to receive a scan instruction from an associated user,
wherein the controller is configured to engage the scan engine to scan a tangible document having a plurality of predefined visible boundaries, each boundary area including characters, to generate an image scan file,
wherein the controller is further configured to generate an image of the document on the touchscreen from the image scan file including a depiction of characters and the visible boundaries,
wherein the controller is further configured to receive a user selected boundary area of a generated image via the touchscreen defining a sub portion of depicted characters, wherein the boundary area is selected in accordance with a user touch of an edge or corner of a boundary thereof,
wherein the controller is further configured to complete an optical character recognition operation on the user selected sub area to generate a character based file corresponding to characters depicted in the user selected sub area,
wherein the controller is further configured to process an electronic translation of the character based file from source language to a target language,
wherein the controller is further configured to superimpose a display of the electronic translation on the touchscreen over at least a portion of the user selected sub area, and
wherein the controller is further configured to generate an updated image of the document on the touchscreen wherein the selected sub area is replaced with the electronic translation.

2. The multifunction peripheral of claim 1 wherein the controller is further configured to process the electronic translation in accordance with a user identified source language and a user identified target language received via the touchscreen.

3. The multifunction peripheral of claim 1 wherein the controller is further configured to display the hybridized image as soon as a user sub area selection is received.

4. The multifunction peripheral of claim 1 wherein the controller is further configured to highlight the boundary of the user selected boundary area after selection thereof.

5. The multifunction peripheral of claim 4 wherein the controller is further configured to generate a printout of the updated image scan file in accordance with user input received via the touchscreen.

6. The multifunction peripheral of claim 4 wherein the controller is further configured to send the updated image scan file to a user supplied destination address.

7. The multifunction peripheral of claim 1 wherein the controller is further configured to receive a user selected sub area comprising the entire image of the document on the touchscreen in accordance with double tap input received via the touchscreen.

8. A method comprising:
receiving a scan instruction from a user via a touchscreen;
engaging a scan engine of a multifunction peripheral to scan a tangible document having a plurality of predefined visible boundaries, each boundary area including characters, to generate an image scan file responsive to the received scan instruction;
generating an image of the document on the touchscreen from the image scan file, the image including a depiction of characters in a source language and the visible boundaries;
receiving a user selected boundary area of a generated image via the touchscreen defining a sub portion of depicted characters, wherein the boundary area is selected in accordance with a user touch of an edge or corner of a boundary thereof;
completing an optical character recognition operation on the user selected sub area to generate a character based file corresponding to characters depicted in the user selected area;
processing an electronic translation of the character based file from the source language to a target language;
displaying the electronic translation on the touchscreen as a hybridized image of the tangible document such that an area outside the user selected sub area appears in the source language and an area inside of the user selected sub are appears in the target language; and
generating an updated image scan file wherein an image area of the image scan file corresponding to the user sub selected area is replaced with an image of the electronic translation.

9. The method of claim 8 further comprising processing the electronic translation in accordance with a user identified source language and a user identified target language received via the touchscreen.

10. The method of claim 8 further comprising generating the hybridized image as soon as a user selected sub area is received.

11. The method of claim 8 further comprising highlighting the boundary of the user selected boundary area after selection thereof.

12. The method of claim 11 further comprising generating a printout of the updated image scan file in accordance with user input received via the touchscreen.

13. The method of claim 11 further comprising sending the updated image scan file to a user supplied destination address.

14. The method of claim 8 further comprising receiving the user selected sub area comprising the entire image of the document on the touchscreen in accordance with double tap input received via the touchscreen.

15. A system comprising:
a scanner configured to generate an electronic image scan file corresponding to an image inclusive of a plurality of predefined visible boundaries, each boundary area including written characters, on a tangible document; and
a processor configured to generate a document image of the tangible document inclusive of a depiction of characters in a source language on a touchscreen display from the image scan file,
wherein the processor is further configured to receive a user selected boundary area on the document image defining a sub portion of written characters, wherein the boundary area is selected in accordance with a user touch of an edge or corner of a boundary thereof,
wherein the processor is further configured to perform an optical character recognition operation on the image scan file to generate a source language file including encoded characters corresponding to the sub portion of written characters, wherein the processor is further configured to translate encoded characters in the source file to translated encoded characters in a target language file, and wherein the processor is further configured to generate a hybridized image of the tangible document wherein characters outside of the sub portion appear in the source language and characters in the selected boundary area appear in target language.

16. The system of claim 15 wherein the processor is further configured to identify the source language from the source language file.

17. The system of claim 15 wherein the processor is further configured to translate the source file to a target language selected by an associated user via the touchscreen.

18. The system of claim 17 wherein the processor is further configured to generate the hybridized image as soon as the user selected sub area is received.

19. The system of claim 18 wherein the processor is further configured to initiate a printout of the document image that includes the superimposed image.

20. The system of claim 15 wherein the processor is further configured to identify the source language in accordance with a user language selection received via the touchscreen.

* * * * *